Figure 1:
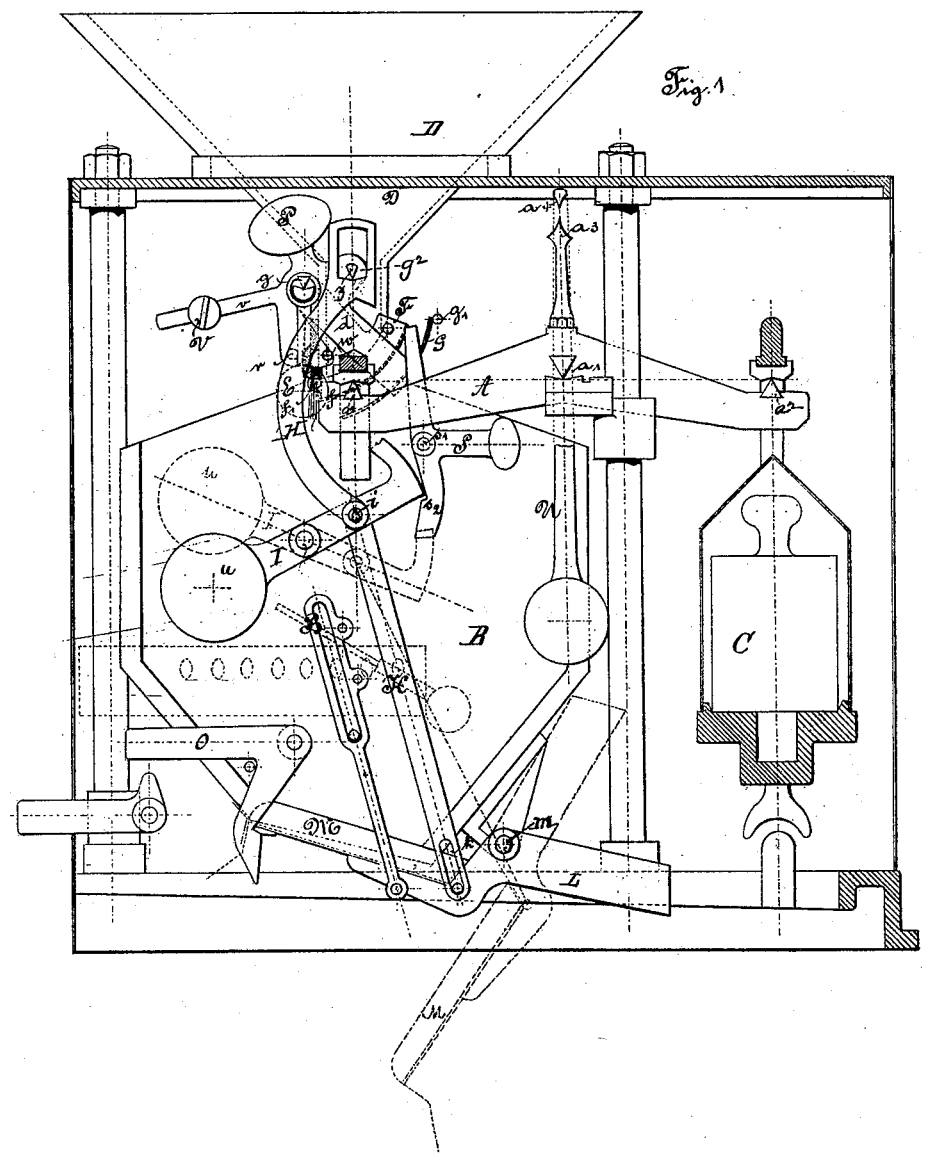

(No Model.) 2 Sheets—Sheet 1.

C. REUTHER.
AUTOMATIC WEIGHING MACHINE.

No. 282,226. Patented July 31, 1883.

Witnesses.
Aug Ispert
Has Beik

Inventor.
Carl Reuther (No Model.) 2 Sheets—Sheet 2.
C. REUTHER.
AUTOMATIC WEIGHING MACHINE.
No. 282,226. Patented July 31, 1883.
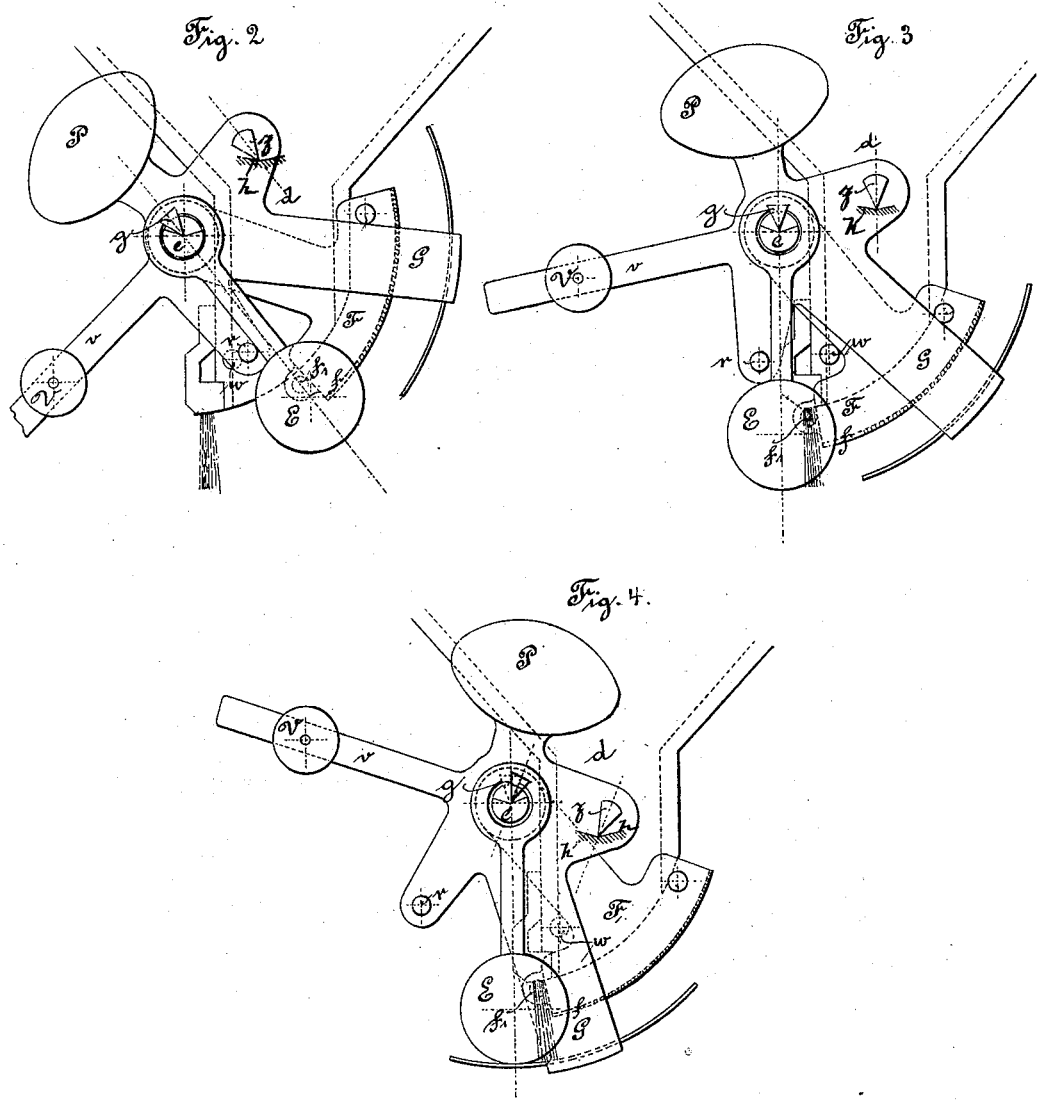
Witnesses.
Aug. Expert
Las Beck.
Inventor.
Carl Reuther

# UNITED STATES PATENT OFFICE.

CARL REUTHER, OF HENNEF, PRUSSIA, GERMANY.

AUTOMATIC WEIGHING-MACHINE.

SPECIFICATION forming part of Letters Patent No. 282,226, dated July 31, 1883.

Application filed June 19, 1882. (No model.)

*To all whom it may concern:*

Be it known that I, CARL REUTHER, of Hennef, in the Kingdom of Prussia, German Empire, have invented certain new and useful Improvements in Automatic Weighing-Machines for Weighing Granular and Pulverous Substances; and I do hereby declare that the following is a full and exact description thereof.

This invention relates to certain improvements on weighing-machines for which a patent, No. 261,257, was granted to me July 18, 1882.

The accompanying drawings represent what I consider the best means of carrying out my present improvements.

Figures 1 to 4 represent the scale for weighing granular and pulverous substances. Figs. 5 and 6 illustrate the scale for weighing liquids. Fig. 1 is a side elevation of the entire scale for granular materials. Figs. 2, 3, and 4 represent the feed mechanism of the same in three different positions on a larger scale.

Similar letters of reference indicate corresponding parts at the same point in all the figures.

A represents the weighing-beam; B, the receptacle; C, the tray for the weights; D, the feed-hopper, from which the grain passes through the spout $d$ into the receptacle B. Below the spout $d$ are two swinging flaps, F and G. The flap F has notches $f$ in its edge, and serves to reduce the supply of grain or the like at intervals, while the flap G effects periodically the complete cutting off of the grain-supply. The plate $g^2$ has a knife-edge, $z$, which rests on the cup $h$ of the rail H, which, if moved up or down, allows the flap G to swing upon the knife-edges $g$. The rail H rests with its lower end on a knife-edge, $i$, on the lever I, which is pivoted to the receptacle B, and carries a weight, $u$. A rod, K, connects the lever I with a lever, L, which is pivoted loosely at $m$—the axis of the hinged door M, by the opening of which the receptacle B is emptied. The door M is secured by means substantially as shown in the patent herein before referred to.

I employ a small adjustable weight, V, which serves to change the position of the center of gravity of the feed-flap G. This weight V is adjustably arranged upon an arm, $v$, that is rigidly connected to the flap G and to the weight P. A pinching-screw serves to hold the weight V in its properly-adjusted position on the arm $v$.

In order to prevent a change of the pressure of the knife-edge $z$ on its bearing, in case of any accidental derangement of the entire machine out of its properly-leveled position, I arrange a pendulum, E, on the center of oscillation or knife-edge $g$ of the flap G. A pin, $r$, fixed to the flap G, acts upon this pendulum and presses the same upward, when both the flaps F and G are opened. (See Fig. 2.) The pressure of both the flaps F and G and of the pendulum E acts, through the knife-edge $z$, upon the rail H; but when the flap F rests upon the pin $w$ the knife-edge $z$ is only affected by the flap G and the pendulum E, and when the pendulum is suspended vertically said knife-edge is only acted upon by the flap G. As explained in my above-mentioned patent, the correctness of the weighing is dependent partly upon the leverage of the center of gravity of the flap G at the time when the latter alone acts upon the knife-edge $z$, and consequently upon the beam A. When the flap G is closed so as to entirely cut off the flow of grain, as shown in Fig. 4, this function will not be disturbed by an accidental tipping of the machine, as the flap turns on the knife-edge and is so balanced by means of the weights and pendulum as to always swing beneath the spout.

The index $a^4$, which is opposite the index $a^3$ of the beam, is not fixed to the frame-work of the automatic scale, but is rigidly connected to a pendulum, U, the axis of which coincides exactly with the axis of the beam A. In consequence of this arrangement the two indexes $a^3$ and $a^4$ will always be opposite each other when the beam A assumes its equilibrium, even if the properly-leveled position of the scale should have been disturbed. The beam A has knife-edges $a^*$, $a'$, and $a^2$, which bear upon a projection on the receptacle B, a part of the fixed framing, and the weight-tray, respectively, as shown in Fig. 1.

The discharge-flap of the vessel is held closed by means of the hook O. The link K is directly connected with the flap M. The longitudinal slot $k$ permits the lever I to be drawn downward by the hand or otherwise, and to be hooked under S when the flap M is closed, so that the scale may be brought into equilibrium, ready to receive grain.

The weighing-machine is provided with a mechanism which interrupts the operation as soon as the feed or discharge mechanisms cease in consequence of some accident, to perform their functions properly. This mechanism consists of a bell-crank lever, S, which turns on center $s'$, fixed to the vessel B. The lever S is fitted with a notch, $s^2$, which holds the lever I up, and prevents the receptacle from opening until said lever I is released from the notch $s^2$. The pin $g'$, projecting from the flap G, bears, when the flap G is closed, against the lever S, and presses the latter so far to one side that the lever I can pass the notch $s^2$ without obstruction, thus allowing the flap M to open. In case a large object should be caught in the channel $d$ of the hopper D, which would prevent the closing of the flap G, the flap M cannot open, although the vessel B is filled, and descends and liberates the hook O, because the pin $g'$ of the flap G cannot press aside the lever S, so that the lever I will remain hooked at $s^2$ on the lever S. The flap F carries a pin, $f$, which prevents the flap G from closing completely so long as the flap F is not completely closed, and consequently a complete interruption of the operation takes place also in case the flap F should not close completely. In case the discharge-flap M should by any accident be liberated from the hook O before the flaps F and G are completely closed, or in case the hook O should not engage with the flap M after the discharge of the vessel has taken place, the engagement of the lever I with the lever S would still arrest the operation.

I claim as my invention—

1. In an automatic scale, substantially as described, the feed-flap G, having a principal weight, P, and an adjustable weight, V, as and for the purposes set forth.

2. In an automatic scale, substantially as described, the pendulum U, carrying the counter-index for the index of the beam, as herein set forth.

3. In an automatic scale, substantially as described, the pendulum E, arranged to control the position of the flap G, as and for the purpose set forth.

4. In an automatic scale, constructed and operating substantially as described, the link K, directly connected with the discharge-flap M, as and for the purpose herein set forth.

5. In an automatic scale, substantially as described, the safety arrangement consisting of the hook $s^2$ on the lever S, in combination with the lever I and its connections, and with suitably-arranged pins on the flaps F and G, as herein set forth.

In testimony whereof I have hereunto set my hand, at Cologne, Prussia, this 2d day of May, 1882, in the presence of two subscribing witnesses.

CARL REUTHER.

Witnesses:
 AUGUST ISPERT,
 MAX BECK.